No. 864,091.
PATENTED AUG. 20, 1907.
H. J. GERNER.
ICE CREAM FREEZER.
APPLICATION FILED FEB. 17, 1906.
2 SHEETS—SHEET 2.
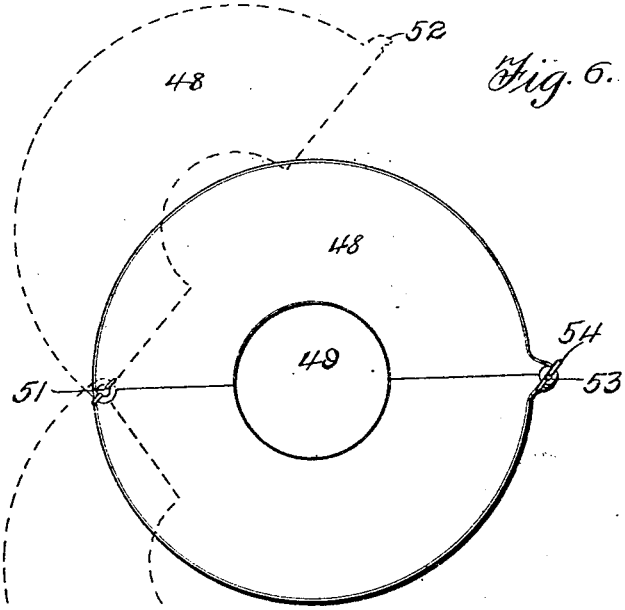
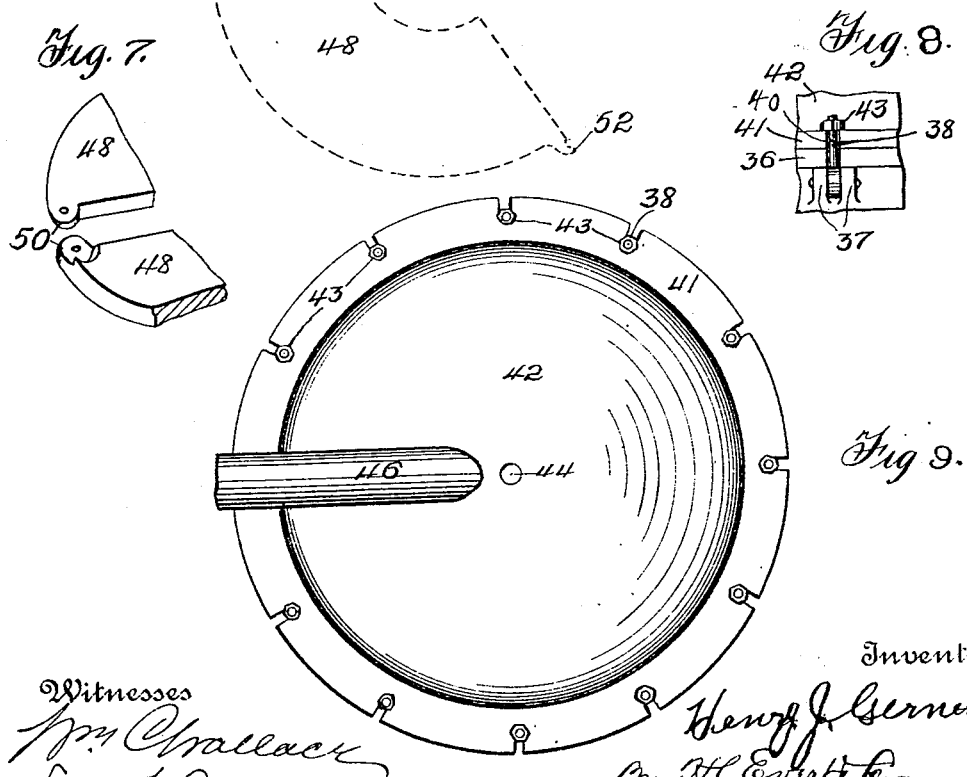
Witnesses
Wm Wallack
Lora S. Avery
Inventor
Henry J. Gerner
By H.C. Everitt, Attorneys

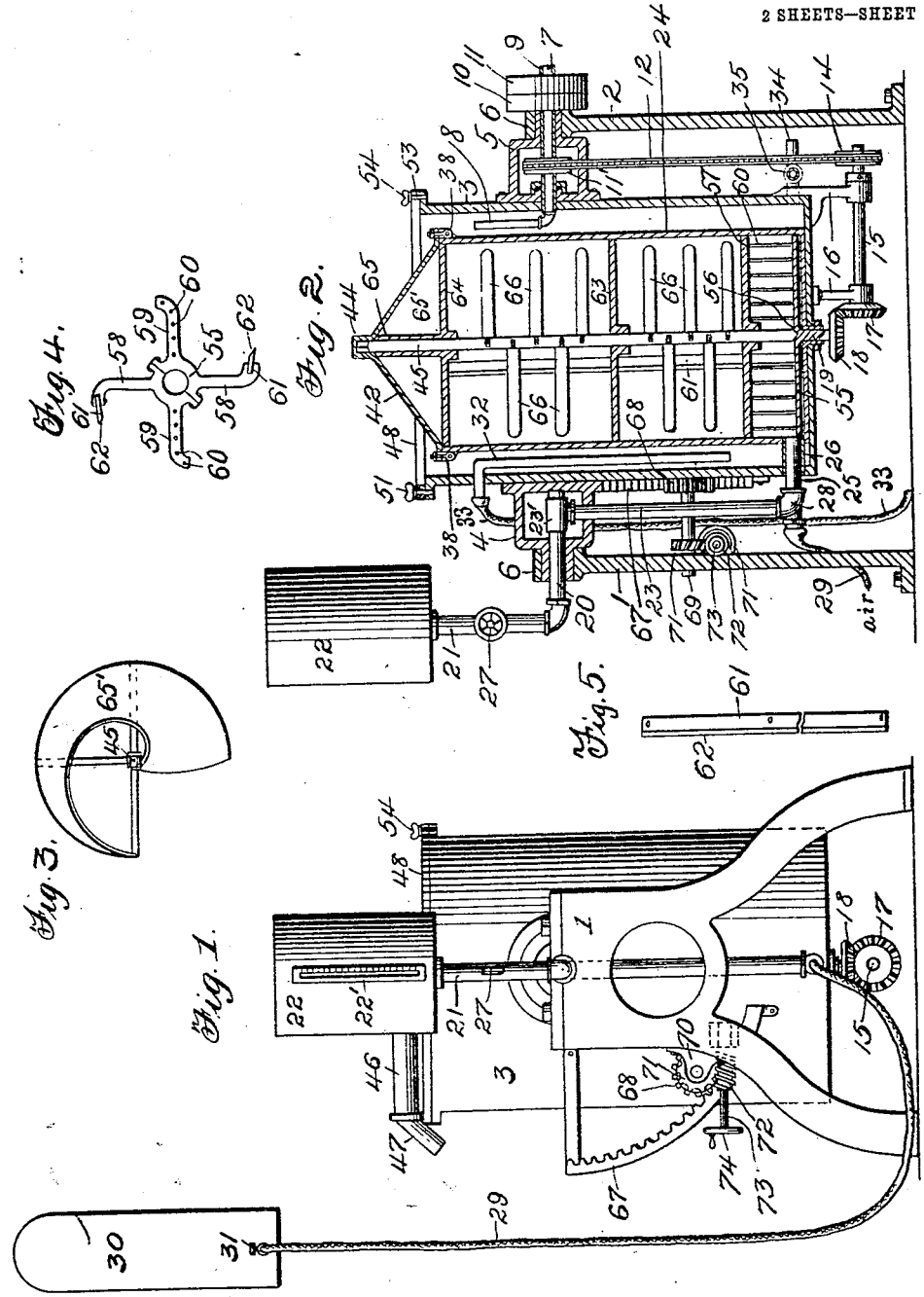

UNITED STATES PATENT OFFICE.

HENRY J. GERNER, OF NIAGARA FALLS, NEW YORK.

ICE-CREAM FREEZER.

No. 864,091.        Specification of Letters Patent.        Patented Aug. 20, 1907.

Application filed February 17, 1906. Serial No. 301,589.

*To all whom it may concern:*

Be it known that I, HENRY J. GERNER, a citizen of the United States of America, residing at Niagara Falls, in the county of Niagara and State of New York, have invented certain new and useful Improvements in Ice-Cream Freezers, of which the following is a specification, reference being had therein to the accompanying drawing.

This invention relates to certain new and useful improvements in ice cream freezers, and relates more particularly to that type which may be styled as a continuous ice cream freezer, being an improvement on the device shown in my prior patent, Jan. 12, 1904, No. 749,286, the present invention like its predecessor having for its object to provide a freezer wherein the cream previous to its entry into the freezer can is subjected to a blast of cooled air, as illustrated in my process patent Oct. 18, 1904, No. 772,656, which has the effect of reducing the temperature of the cream prior to its being subjected to the frigid temperature within the freezer-can, and thereby shortening the time necessary to bring the cream to a frozen state.

In my prior patents referred to above, the freezer-can is horizontally-mounted in a tub, which latter is mounted on a table capable of being tilted to different inclinations whereby to incline or tilt the freezer-can, and in said patent both the freezer-can, and the agitator or dasher are arranged for rotation.

In the present invention the device embodies a vertically-mounted freezer-can, dasher, and tub, the can being stationary in the tub, and a part of the dasher or agitator being revoluble, while another part thereof remains stationary in the can. The cream to be frozen is fed into the can at the bottom of the latter, through a pipe extending through one of the hollow trunnions of the supporting structure of the device, the said pipe communicating with a suitably supported reservoir arranged preferably at a point equal with or above the height of the can. Where brine is used as a freezing agent, the same is fed into the tub through the opposite hollow trunnion of the supporting structure. Means is provided for inclining the tub and can to bring the same into any desired position between the vertical and horizontal positions. Air is supplied from a suitable source of supply, and is led into the feed pipe at a point near where the said pipe enters the cream can, whereby the air not only serves to reduce the temperature of the cream prior to the delivery of the latter to the freezer-can, but acts to project or propel the cream forcibly into the can, such action having a tendency to create a light foam on the cream and thereby materially assist in diminishing the required time to bring the cream to a frozen state, as well as imparting to the frozen cream a smoother and more tasteful effect.

In lieu of feeding the cream from the reservoir through a hollow dasher shaft into the freezer-can as shown in my prior patent referred to, the present invention embodies a means for feeding direct from the feed pipe to the can, and improvements in the dasher made necessary by the change from the prior method of feeding the cream to the can.

The present invention also involves improvements in the can structure and the lid of the freezing-agent tub, all of which improvements together with other details of construction and improvements in the present device will hereinafter appear as the description of the present invention proceeds.

A practical embodiment of the present invention is illustrated in the accompanying drawings, in which:—

Figure 1 illustrates a side view of an ice cream freezer constructed in accordance with my invention; Fig. 2 is a central vertical sectional view of the same; Fig. 3 is a top plan view of the cream discharge conveying screw of the dasher; Fig. 4 is a detailed plan view of one of the revoluble spider sections of the dasher, showing the scraper-bars carried thereby; Fig. 5 is a detached detailed view of one of the scraper-bars partly broken away; Fig. 6 is a plan view of the freezer-tub lid, showing the same in its closed position in full lines, and in a partially open position in dotted lines; Fig. 7 is a detailed perspective view of a part of each member of the freezer-tub lid; Fig. 8 is a side elevation of a part of the freezer-can and the top, showing in detail one of the clamps which hold the can top to the can; Fig. 9 is a top plan view of the freezer-can, with the discharge spout partly broken away.

The embodiment of my invention illustrated in the accompanying drawings, comprises two upright stands or housings 1 and 2 respectively, on which the tub with its contained freezer-can and parts is hung, and upon which uprights or housings the said tub is adapted to swing. The tub 3, has secured to opposite sides thereof hollow trunnions 4 and 5 respectively, which are journaled in bearings 6 at the upper ends of the uprights or housings 1 and 2. These hollow trunnions are preferably constructed as shown, that is, with a box-like portion, and with the hollow neck projecting into the bearings 6. Through the hollow trunnion 5 is extended a shaft 7, that enters the tub 3, and is preferably provided with a short upwardly-projecting extension 8, extending upwardly to a point near the top of the freezer tub 3. This pipe is used as the feed pipe for brine, when the latter is used as a freezing-agent, and the extension 8 of the pipe is provided so that brine will not back-flow through the pipe 7 unless it has reached a point near the top of the freezer-can, and at this time the flow of the brine should be shut off, such checking of the flow being accomplished in any desired manner, as by a cock or valve (not shown) in the pipe at any desired point between the uprights and the supply of brine.

A sleeve 9 surrounds the horizontally-extending portion of the pipe 7, and has mounted thereon pulleys 10 and 11, one of which is adapted to be used in the ordinary manner as the drive-pulley, and the other of which is adapted to have the drive-belt (not shown) shifted thereonto, when it is not desired to operate the mechanism, but without shutting off the power supply. On said sleeve 9, within the box-like portion of the hollow trunnion 5, is mounted a sprocket-wheel 11′, which receives a sprocket-chain 12, passing over said wheel 11′, and over a sprocket-wheel 14, carried adjacent the outer end of a shaft 15. The said shaft 15 is journaled in suitable hangers 16, attached to the tub 3, and on its inner end carries a beveled-pinion 17, which meshes with a like pinion 18, carried on the lower end of a short shaft 19, journaled in the bottom of the tub 3. It will be observed that a belt and pulleys might be substituted for the chain 12, and the sprocket-wheels 11′, 14, without departing from the spirit of the present invention.

A pipe 20, extends through the hollow trunnion 4, at the opposite side of the tub, and communicates through a branch 21, with a cream reservoir 22, which may be suitably supported in any desired manner, direct from the standard or housing 1 if desired. A vertical pipe 23 leads from the pipe 20, downwardly between the standard or housing 1, and the tub 3, to a point approximately at the bottom of the cream-can 24, and is led in through the wall of the tub and the wall of the cream-can by a branch pipe 25. The pipe 23 is suitably connected to pipe 20, as by a swinging union 23′. It is preferred to surround the branch-pipe 25 with a covering 26, of any desired material, which will protect the pipe 25 from the chilling action of the brine in the space between the freezer-can and the tub, and thereby obviate undue chilling of the cream as it passes through pipe 25. At any desirable point in the feed pipe above described, a controlling valve 27 is placed, and I preferably in practice locate the same in a branch 21 of said pipe. The branch 25 of said feed pipe is in practice connected to the branch 23 thereof by a union 28, and communicating with this union is a flexible air pipe 29 which leads to a storage tank 30 for compressed air. It will be evident that an air pump or fan might be used in lieu of the tank for compressed air, but I have preferably employed the tank, and it will be observed that where said tank is employed, it must be positioned at a point as high as the reservoir, to prevent the flow of cream into the air tank or receiver. A suitable controlling valve 31 is provided whereby the quantity of air admitted into the pipe 29 may be regulated. In order to determine the quantity of cream in the reservoir 22, I provide the same with an indicating glass or graduation 22′ as shown.

A circulation of the brine, when the latter is used as a freezing-agent is effected by means of overflow pipe 32, arranged within the freezer-tub, with its inlet end at a point near the bottom of the tub, and at its upper end extended out through the tub at a point approximately on a line with the discharge end of pipe 8. Thus the brine is prevented from overflowing in the tub, even should the flow not be checked through pipe 7. To the outer end of the pipe 32, that is, to the discharge end thereof which is outside the tub 3, is connected a flexible hose 33, through which the brine may be conducted again to the brine reservoir or to any desired point. The tub may be drained of the freezing-agent through drain-pipe 34, communicating with the tub adjacent the bottom thereof, and having a shut-off cock or valve 35.

The freezer-can 24, is stationary in the tub 3, the stub-shaft 19 heretofore referred to, extending through and being journaled in the bottom of said can as well as in the bottom of the freezer-tub 3. At its upper end the said freezer-can 24, is provided with a peripheral annular flange 36. This annular flange carries depending lugs 37, which are arranged in pairs around the flange, each pair being separated from the adjacent pairs the desired distance, and in each pair of said lugs 37, is pivoted a clamp-bolt 38. The peripheral flange 36, is slotted at points registering with the space between each pair of lugs 37, as indicated at 39, these slots 39 registering with slots 40, which are formed in a seating flange 41 carried by the can top 42. The shanks of the bolts 6 are received in said slots 39 and 40, and the bolts are securely fastened so as to clamp the top 42 onto the can 24, by means of nuts 43. It will be observed that by simply slacking up the nuts 43, the shanks of the bolts can be swung out of the slots 39 and 40, and the can top removed from the can. The can top 42 is substantially pyramidal or frusto-conical in shape, and at the apex, is formed with a socket 44, which receives the square upper end of the stationary dasher shaft 45, the said square end of the shaft seating in said socket serving to hold the shaft against rotation. A discharge spout 46 leads outwardly from the can top 42, and is preferably provided at the outer end with an inclined discharge spout portion 47, to direct the discharge of the frozen substance into a suitably positioned vessel or receptacle.

The freezer-can is held against lateral movement at the upper end by the lid of the freezer-tub, which lid is shown in detail in Fig. 6 of the drawings, and embodies two similar sections 48, adapted to match together as shown, each section or member provided on its matching face with a semicircular cutout portion whereby to form the circular opening 49, to receive the can top 42. At one end of the matching face of these sections, each section is provided with an apertured ear 50, the one ear resting on the other and being pivoted together to form a hinge, the sections swinging outwardly or inwardly as the case may be on the pivot bolt 51. At the opposite end of the matching face of the sections, the same are provided with lugs 52, notched on their confronting faces, as seen in the dotted line position of the cover, so as to fit around a clamp bolt 53, carried by the peripheral flange of the tub 3, and provided with a thumb-nut 54. It will be observed that when the sections are closed together and the thumb-nut 54 tightened, that the said sections will be held in their closed position on the can top.

The dasher which is one of the improvements of the present invention, embodies both movable and stationary parts. To this end I provide a plurality of spider-like sections or members, generally made in two parts, so that they can be clamped to the dasher shaft, one of which sections or members is shown in detail in Fig. 4. The lowermost spider 55, carries the stub-shaft 19, and is provided centrally with a seat 56, to receive the lower tapered end of the stationary dasher shaft 45. Clamped to the said stationary dasher shaft a short distance above the lowermost spider is a second spider 57, of similar construction to the spider 55, each of these spiders embodying radially projecting arms 58, 58, and 59, 59. The arms 59, 59, of spider 57 are connected to similar arms of spider 55, by vertical bars 60, while the arms 58 of each spider are provided with notched outer ends in which is secured the scrapers 61, preferably provided with a beveled scraping edge 62. These scrapers serve as the connecting medium for attaching spiders 55, 57, 63 and 64 altogether, said spiders being arranged at intervals on the shaft 45. The uppermost spider 64 is provided with a central sleeve extension 65, the upper end of which bears against the lid 42 at the top, and which rotates on the stationary dasher shaft 45, and carries the spiral discharge screw 65', by means of which the frozen substance is ejected from the can into the discharge spout 46. The said stationary dasher-shaft 45 is provided with radially-extending beater-arms 66, which are preferably connected to the shaft by providing threaded apertures in the shaft, and reduced threaded portions on the beater arms so that the latter may be screwed directly into the shaft, and adjusted as may be desired. It is to be noted that these beater arms are of a less length than the arms 58, 59 of the spiders, and, in operation, the shaft 45 with its beater arms remains stationary, while the spiders 55, 57, 63, 64, and the scraper-bars 61 which connect all these spiders in unison, and also the bars 60, which connect spiders 55 and 57, rotate in unison, the scraper bars 61, in their rotation passing between the outer ends of the beater arms 66 and the inner wall of the freezer-can.

In order to tilt the tub from a vertical to a horizontal position, or to any position desired, and more especially to provide for a tilting of the tub at the time of finishing the freezing process, so as to permit of the discharge of all the cream from the can, I provide a segment-rack 67, mounted on one side of the freezer-tub and which is engaged by a pinion 68 carried on shaft 69 journaled in a bracket 70, carried by the standard or housing 1. This shaft 69 also carries a gear 71, which meshes with a worm gear 72, provided on an operating shaft 73, journaled in a bracket carried by the standard 1, and which shaft 73 extends at right angles to the shaft 69; a suitable operating handle or wheel 74 is provided on the outer end of shaft 73. By this construction, it will be observed that when shaft 73 is operated, the motion transmitted through the medium of worm-gear 71, to shaft 69, will be transmitted through said shaft to pinion 68, and as this pinion travels in the segment-rack 67, the freezer-tub and can may be swung into the desired position. If desired, any approved locking means may be employed for holding the tub at a certain inclination, though generally this is not necessary, as at the time the tub is being inclined the operator has hold of the handle 74.

In operation, the drive-belt (not shown) engaging pulley 10, causes rotation of sleeve 9, imparting movement to sprocket wheel 11', and chain 12, thus driving shaft 15 through the medium of sprocket 14, and causing gears 17, 18 to rotate stub-shaft 19, thereby imparting rotation to the spiders 55, 57, 63 and 64 of the dasher, together with discharge-screw 65', owing to these several spiders being connected together by the scraper bars 61. When the controlling cock or valve 27 is opened, cream will flow by gravity from reservoir 22 down branch pipe 25, and when it reaches branch pipe 25, is caught by the blast of air entering through hose 29, from the air tank 30, and projected by the said air blast into the freezer-can 24. The cream thus projected into the can by the air blast will be thoroughly agitated by the vertical bars 66 connecting the two lowermost spiders, and as the cream rises in the can, and becomes partially congealed, the body of partially congealed substance will be agitated and beaten so as to effect the desired fineness of the product by the said body being carried against the beater arms of the dasher shaft due to the revolving of the spiders and scraper bars of the dasher. As the substance becomes congealed or frozen, the tub and its contained can is tilted by the mechanism heretofore described, so as to permit the discharge-screw 65 to carry the frozen substance to the outlet spout 46, from whence it is delivered into any suitably positioned receptacle.

Having fully described my invention, what I claim as new and desire to secure by Letters Patent is:

1. In an ice-cream freezer, a vertically-disposed freezer-tub trunnioned to swing in uprights or housings, a freezer-can mounted stationary within said tub, a brine feed pipe extending through one of the housings and into the tub for supplying brine to said tub, a cream feed pipe extending through the other of said housings and communicating with the interior of the can for supplying cream to said can, manually-controlled means for swinging the tub in its housings to move it from a vertical position to an inclined and horizontal position, and agitating means within the freezer-can.

2. In an ice-cream freezer, a freezer-tub trunnioned in uprights or housings, a freezer-can mounted within said tub and stationary therein, means extending through one of the trunnions and communicating with the interior of the tub for supplying brine to said tub, a cream supply can mounted at a point higher than the trunnions of the tub, a cream feed pipe connected to said cream supply can and extending through the other of said trunnions and through the tub and freezer-can with its discharge end communicating with the interior of the said freezer-can adjacent the bottom of the latter, agitating means within the freezer-can, and manually-controlled means for inclining the freezer-tub and can.

3. In an ice cream freezer, a freezer tub having hollow trunnions, uprights or housings in which said trunnions are journaled, means extending through one of said hollow trunnions and discharging near the upper end of said tub for feeding a freezing agent into the tub, a freezer can mounted in said tub, means extending through the opposite trunnion and communicating with the freezer-can near the bottom thereof for feeding cream into the said can, and agitating means within the can.

4. In an ice cream freezer, a freezer can, and an agitator comprising a stationary agitator shaft, a plurality of beater arms carried by said shaft, and a plurality of spider sections rotatable on the shaft, scraper bars connecting the said spider sections together, and a discharge screw carried by the uppermost spider section.

5. In an ice cream freezer, a freezer can, and an agitator, embodying a stationary dasher shaft mounted in the can, a plurality of beater arms having their ends threaded into the said shaft whereby the arms may be adjusted to vary the distance between their outer ends and the walls of the can.

6. In an ice cream freezer, a freezer can, and an agitator comprising a stationary dasher shaft, beater arms carried by said shaft, a plurality of spider sections superposed one above the other on the shaft and rotatable thereon, scraper bars connecting the spider sections together, and a discharge screw carried by the uppermost spider section.

7. In an ice cream freezer, a freezer can, and an agitator, comprising a spider section having a stub shaft extending through the bottom of the can, means connected to said stub shaft for rotating the same, a stationary dasher shaft seated on said spider section, a second spider section rotatable on the shaft, vertical bars connecting said spider sections, an upper spider section rotatable on the shaft near its upper end, and having a discharge screw, and scraper bars connecting all of the spider sections together whereby they rotate in unison.

8. In an ice cream freezer, a freezer can, and an agitator, comprising a lower spider section, means for driving said spider section, a stationary dasher shaft seated on said spider section, and a plurality of spider sections rotatable on the shaft, the upper of which spider sections has a discharge screw, and scraper bars connecting said spider sections together whereby they rotate in unison.

In testimony whereof I affix my signature in the presence of two witnesses.

HENRY J. GERNER.

Witnesses:
WM. C. WALLACE,
LORA S. AVERY.